Aug. 1, 1950

J. R. C. QUILTER 2,517,417

PARACHUTE

Filed May 14, 1947

INVENTOR
John Raymond Cuthbert Quilter
BY: John H. Graham
HIS ATTORNEY.

Patented Aug. 1, 1950

2,517,417

UNITED STATES PATENT OFFICE 2,517,417

PARACHUTE

John Raymond Cuthbert Quilter, Woking, England

Application May 14, 1947, Serial No. 747,927
In Great Britain May 24, 1946

4 Claims. (Cl. 244—142)

This invention relates to parachutes.

The main object of the invention is to provide an improved parachute for safe descent from high-speed aircraft, the regular parachute equipment being liable to fail when brought into use at high speeds owing to the fabric of the canopy bursting or tearing under the high internal pressure exerted by the air.

A specific object of the invention is to provide a parachute comprising two canopies, one made of a more porous fabric than the other so that the air may filter through the more porous fabric before reaching the other canopy which is thereby inflated at a relatively safe pressure.

A further object of the invention is to provide an improved parachute comprising a dome-shaped main canopy in combination with an inner parachute of the annular or ring type, the inner parachute being concentric with the main canopy and adapted to extend partly within the latter when both are inflated.

Other objects and advantages of the invention will hereinafter appear from the following description of a preferred embodiment, given with reference to the accompanying diagrammatic drawings, in which.

Figure 1:
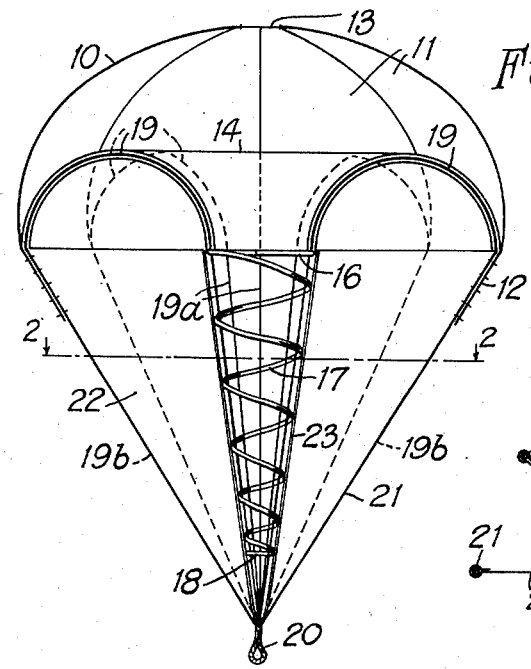
Fig. 1 is a cross-sectional view showing the parachute in operative condition, with both the main or dome-shaped canopy and the inner ring-type parachute fully deployed.
Figure 2:
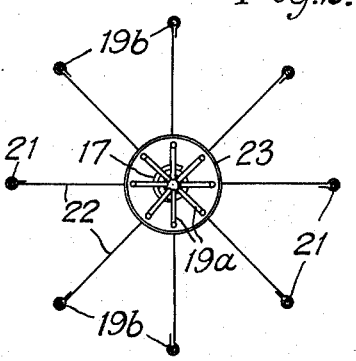
Fig. 2 is a section on the line 2—2 of Fig. 1.

These drawings represent an embodiment of the invention, as applied to a vane-fitted parachute of the kind intended for use as a pilot or retarder parachute for the extraction of a load-supporting parachute from the pack.

The main dome or canopy 10, comprising for example eight substantially triangular gores 11 and having a diameter of about four feet when deployed, is provided with four diametrically disposed rigging lines 12 which are secured over the seams between the gores 11 and cross in the middle of an apical vent 13 about two inches in diameter. The outer edges of the canopy gores 11 are stitched to the external periphery of a ring-type parachute 14, also made for example in eight segments 15, of which the inner edges are connected to a wire ring 16 about nine inches in diameter; this ring, which is substantially level with the external periphery in the deployed condition of the parachutes (see Fig. 1), may form the top end of a tapering coiled spring 17 having an extended length of about two feet, a bottom end 18 about three inches in diameter and three or more complete coils of quick pitch between its ends.

Figure 3:
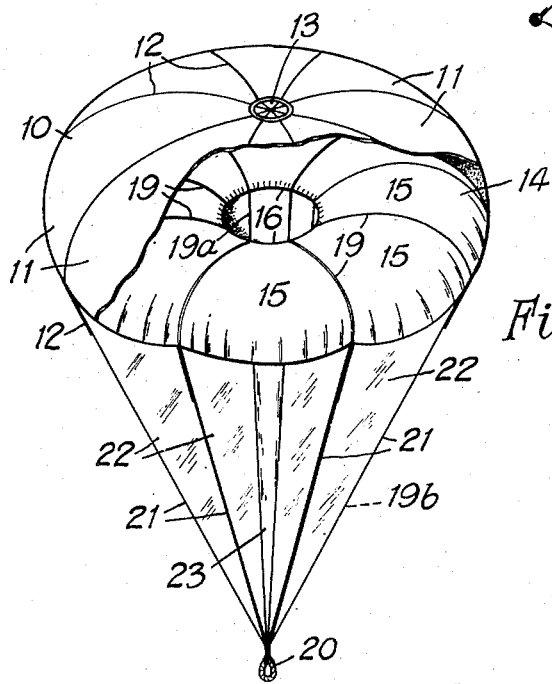
Fig. 3 is a perspective view with the main canopy partly broken away.

Eight rigging lines 19, disposed in radial planes, are secured over the seams between adjacent segments 15 of the ring-type parachute 14, which is made with sufficient fullness to allow the fabric to lift to an arched cross-section with a rise of about six inches between its internal and external peripheries, that is, between the ring 16 at the top end of the spring 17 and the external periphery secured to the outer edges of the main dome or canopy 10. The rigging lines 19 at the inner periphery are passed down through the spring coils, as indicated at 19a, to connect with the load-attachment buckle or the like 20, adjacent to which they are knotted or spliced to their other ends 19b passing down from the outer periphery of the parachute; the latter portions 19b of these rigging lines are enclosed in seams 21 along the outer edges of eight vanes or gusset pieces 22, the inner edges of which are connected to form a conical bag or stocking 23 surrounding the wire spring 17 but attached thereto only at the top end. The upper edges of the vanes or gusset pieces 22, which are aligned radially with the seams of the ring-type parachute 14 (see Fig. 3), extend (as shown in Fig. 1) from the external periphery direct and substantially straight to the spring coil at the inner periphery, thus leaving a free space above them for internal movements of the air below the ring-type parachute 14. The upwardly arched cross-sectional shape of the parachute 14 takes it clear above the straight upper edges of the vanes 22, so that the air rising between the vanes into this free space can filter through the more porous fabric of which this parachute is composed before reaching the main dome or canopy 10, which is made of less porous fabric, this canopy 10 being thereby inflated at a relatively safe pressure.

The eight extremities of the four rigging lines 12 of the main dome or canopy 10 are carried down beside the outer portions 19b of the rigging lines of the ring-type parachute 14, for example to a length of about ten inches, the two lines 12 and 19b being stitched together firmly along the outer edge of the respective vane or gusset-piece 22.

In operation, when the pilot parachute is ejected from the pack by the opening spring, the vanes 22 will prevent fouling as the inner or ring-type parachute 14 becomes deployed; the main blast of air will then act upon the interior of this inner parachute, filtering through the relatively porous fabric and causing the inflation of the main dome 10, after which the extraction of the main parachute from the pack will proceed in the normal manner.

The invention may be applied to a main load-carrying parachute, with or without a pilot parachute, the opening spring and its enclosing bag or stocking being then omitted. The numbers of the respective rigging lines provided may be different from those mentioned above; for example, in the case of a load-carrying parachute, the dome-shaped canopy may have twelve rigging lines crossing at the apex to give twenty-four extremities, some of which will be secured to the rigging lines from the external periphery of the ring-type parachute and the remainder continued down to the load-attachment buckle or the like. Both the main canopy and the inner ring-type parachute may consist of any convenient number of gores or segments, and the rigging lines 12 of the main canopy may be omitted, if desired, in which case the sustaining force of the main canopy will be transmitted to the rigging lines 19b at the external periphery of the inner parachute.

What I claim is:

1. A parachute comprising a main canopy of substantially domed shape, an inner canopy of annular shape, said inner canopy being of arched cross-section between its internal and external peripheries with said internal and external peripheries at substantially the same level in the operative position of said parachute, said inner canopy extending partly within said main canopy when both canopies are inflated, the periphery of said main canopy being secured to the external periphery of said inner canopy, and rigging lines secured to said main and inner canopies, said inner canopy being made of a fabric more porous than said main canopy.

2. A parachute comprising a main canopy of substantially domed shape, an inner canopy of annular shape, the periphery of said main canopy being secured to the external periphery of said inner canopy, rigging lines secured to the periphery of said main canopy, a wire ring secured to the internal periphery of said inner canopy, said wire ring and internal periphery being substantially level with said external periphery in the operative position of said parachute, and other rigging lines secured to the external and internal peripheries of said inner canopy, said inner canopy being of arched cross-section and extending upwardly between said wire ring and the external peripheries of both canopies when inflated.

3. A parachute comprising a main canopy of substantially domed shape, an inner canopy of annular shape, said inner canopy being of arched cross-section between its internal and external peripheries and extending partly within said main canopy when both canopies are inflated, rigging lines secured to the periphery of said main canopy, and other rigging lines secured to the external periphery of said inner canopy and extending over the arched surface of said inner canopy, the extended portions of said other rigging lines being continued down from the internal periphery of said inner canopy, and a tapering coiled spring having its top end formed as ring, said top end being secured to the internal periphery of said inner canopy, and the extended portions of said other rigging lines being continued down from said internal periphery through the coils of said spring.

4. A parachute comprising a main canopy of substantially domed shape, an inner canopy of annular shape, said inner canopy being of arched radial cross-section and located wholly within said main canopy when both canopies are inflated in the operative position of said parachute, both said canopies having their external peripheries secured together, a tapering coiled spring having its top end secured to the internal periphery of said inner canopy, rigging lines extending over the upper surface of said inner canopy, said lines continuing downwards from said internal periphery through the coils of said spring and also downwards from the external periphery of said inner canopy, and a load attachment below the bottom end of said spring, said attachment being connected to the extremities of said lines extending from both peripheries of said inner canopy.

JOHN RAYMOND CUTHBERT QUILTER.

REFERENCES CITED

The following references are of record in the file of this patent:

UNITED STATES PATENTS

| Number | Name | Date |
|---|---|---|
| 1,303,976 | Smith | May 20, 1919 |
| 1,353,130 | Ruff | Sept. 14, 1920 |
| 1,780,104 | Adams | Oct. 28, 1930 |
| 2,104,966 | Baker | Jan. 11, 1938 |
| 2,299,407 | Quilter | Oct. 20, 1942 |
| 2,358,582 | Little | Sept. 19, 1944 |
| 2,365,230 | Volf | Dec. 19, 1944 |

FOREIGN PATENTS

| Number | Country | Date |
|---|---|---|
| 1,235 | Netherlands | May 1, 1916 |
| 141,741 | Switzerland | Oct. 16, 1930 |